United States Patent
Tsukamoto

(10) Patent No.: US 12,215,212 B2
(45) Date of Patent: Feb. 4, 2025

(54) AQUEOUS RESIN CROSSLINKING AGENT, AQUEOUS RESIN CROSSLINKING AGENT-CONTAINING LIQUID, AND AQUEOUS RESIN COMPOSITION

(71) Applicant: NISSHINBO CHEMICAL INC., Tokyo (JP)

(72) Inventor: Nami Tsukamoto, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 417 days.

(21) Appl. No.: 17/435,741

(22) PCT Filed: Mar. 4, 2020

(86) PCT No.: PCT/JP2020/009234
§ 371 (c)(1),
(2) Date: Sep. 2, 2021

(87) PCT Pub. No.: WO2020/179835
PCT Pub. Date: Sep. 10, 2020

(65) Prior Publication Data
US 2022/0135770 A1 May 5, 2022

(30) Foreign Application Priority Data
Mar. 5, 2019 (JP) .................................. 2019-039955

(51) Int. Cl.
C08K 5/29 (2006.01)
C08G 18/02 (2006.01)
C08G 18/09 (2006.01)
C08G 18/16 (2006.01)
C08G 18/28 (2006.01)
C08G 18/38 (2006.01)
C08G 18/75 (2006.01)
C08K 5/00 (2006.01)
C08K 5/42 (2006.01)

(52) U.S. Cl.
CPC .............. *C08K 5/29* (2013.01); *C08G 18/025* (2013.01); *C08G 18/095* (2013.01); *C08G 18/166* (2013.01); *C08G 18/283* (2013.01); *C08G 18/3819* (2013.01); *C08G 18/755* (2013.01); *C08G 18/758* (2013.01); *C08K 5/0025* (2013.01); *C08K 5/42* (2013.01); *C08G 2150/00* (2013.01); *C08G 2170/00* (2013.01); *C08K 2201/014* (2013.01)

(58) Field of Classification Search
CPC .. C08G 18/025; C08G 18/095; C08G 18/283; C08G 18/797
See application file for complete search history.

(56) References Cited

U.S. PATENT DOCUMENTS

| | | |
|---|---|---|
| 4,820,863 A | 4/1989 | Taylor |
| 2002/0086162 A1 | 7/2002 | Masuda et al. |
| 2012/0264968 A1 | 10/2012 | Yanagisawa et al. |
| 2018/0371237 A1 | 12/2018 | Tsukamoto et al. |
| 2020/0017628 A1 | 1/2020 | Banno et al. |
| 2021/0139632 A1 | 5/2021 | Nishikawa et al. |

FOREIGN PATENT DOCUMENTS

| | | | |
|---|---|---|---|
| CN | 102666726 A | 9/2012 | |
| CN | 107709390 A | 2/2018 | |
| CN | 110099965 A | 8/2019 | |
| CN | 110573545 A | 12/2019 | |
| EP | 0 507 407 A1 | 10/1992 | |
| EP | 0 628 582 A2 | 12/1994 | |
| JP | 63-264128 A | 11/1988 | |
| JP | 2001-11152 A | 1/2001 | |
| WO | WO 2017/006950 A1 | 1/2017 | |
| WO | WO-2018123362 A1 * | 7/2018 | ......... C08G 18/0823 |
| WO | WO 2018/194102 A1 | 10/2018 | |

OTHER PUBLICATIONS

Extended European Search Report for European Application No. 20765617.4, dated Nov. 25, 2022.
Chinese Office Action and Search Report for Chinese Application No. 202080018112.3, dated Jan. 5, 2022.
International Search Report, issued in PCT/JP2020/009234, dated May 19, 2020.
Taiwanese Office Action and Search Report dated Aug. 21, 2023 for Application No. 109107198 with an English translation.

* cited by examiner

*Primary Examiner* — Stephen E Rieth
(74) *Attorney, Agent, or Firm* — Birch, Stewart, Kolasch & Birch, LLP

(57) ABSTRACT

A waterborne resin crosslinking agent containing a predetermined polycarbodiimide compound (A) having an oxyalkylene group, a predetermined polycarbodiimide compound (B), and a surfactant (C), each polycarbodiimide compound has a structure in which an isocyanate group is capped with a predetermined end-capping compound at each of both terminals, a total content of the oxyalkylene group in (A) is 15% by mass or more, a total content of the oxyalkylene group in (A) and (B) based on a total amount of (A) and (B) is 10% by mass or less, and a content of (C) is 0.1 to 20 parts by mass based on a total content of (A) and (B) of 100 parts by mass.

16 Claims, No Drawings

AQUEOUS RESIN CROSSLINKING AGENT, AQUEOUS RESIN CROSSLINKING AGENT-CONTAINING LIQUID, AND AQUEOUS RESIN COMPOSITION

TECHNICAL FIELD

The present invention relates to a carbodiimide-based waterborne resin crosslinking agent, and a waterborne resin crosslinking agent-containing liquid and a waterborne resin composition comprising the same.

BACKGROUND ART

A waterborne resin, which has water solubility or water dispersibility, is excellent in handleability in terms of the environment and safety, and thus is used in various applications such as a paint, an ink, a fiber treatment agent, an adhesive, and a coating agent. In the waterborne resin, a hydrophilic group such as a hydroxyl group or a carboxy group is introduced in order to impart water solubility or water dispersibility to the resin itself. Therefore, the waterborne resin tends to be inferior in water resistance and durability to an oil resin.

Because of this, in order to improve various physical properties such as water resistance, durability, and strength of the waterborne resin, a crosslinking agent is added to the waterborne resin.

As an example of such a crosslinking agent, a polycarbodiimide compound is known. For example, PTL1 discloses that by mixing two polycarbodiimide compounds, including a polycarbodiimide compound having a predetermined hydrophilic group at a terminal, at a predetermined ratio, it is possible to obtain a waterborne resin crosslinking agent which has excellent storage stability when it is caused to coexist with a waterborne resin and retains the crosslinking performance even when it is caused to coexist therewith for a long period of time.

CITATION LIST

Patent Literature

PTL1: WO 2017/006950

SUMMARY OF INVENTION

Technical Problem

However, for the mixture of the polycarbodiimide compounds disclosed in the above PTL1, it cannot be deemed that a cured product of a waterborne resin obtained by curing it using the mixture as a crosslinking agent has sufficient water resistance, solvent resistance, and water-resistant adhesion.

Therefore, when a waterborne resin is cured using a carbodiimide-based crosslinking agent, it is required to improve water resistance, solvent resistance, and water-resistant adhesion as characteristics of the cured product of the waterborne resin.

The present invention has been made to solve the above problems, and an object thereof is to provide a carbodiimide-based, waterborne resin crosslinking agent that not only is excellent in the storage stability when the crosslinking agent and a waterborne resin are caused to coexist, but also can improve the water resistance, the solvent resistance, and the water resistant adhesion of a cured product of the waterborne resin, and a waterborne resin crosslinking agent-containing liquid and a waterborne resin composition comprising the same.

Solution to Problem

The present invention is based on the finding that the water resistance, the solvent resistance, and the water-resistant adhesion of a cured product of a waterborne resin are improved by using a mixture of specific polycarbodiimide compounds in a carbodiimide-based, waterborne resin crosslinking agent.

Specifically, the present invention provides the following [1] to [16].

[1] A waterborne resin crosslinking agent comprising at least one polycarbodiimide compound (A) selected from the group consisting of a polycarbodiimide compound (A1) and a polycarbodiimide compound (A2), a polycarbodiimide compound (B), and a surfactant (C), wherein the polycarbodiimide compound (A1) has a structure in which an isocyanate group is capped with an end-capping compound (T1) represented by the following general formula (1) at both terminals, the polycarbodiimide compound (A2) has a structure in which an isocyanate group is capped with the end-capping compound (T1) at one terminal and has a structure in which an isocyanate group is capped with an end-capping compound (T2) at the other terminal, the polycarbodiimide compound (B) has a structure in which an isocyanate group is capped with an end-capping compound (T3) at one terminal and has a structure in which an isocyanate group is end-capped with an end-capping compound (T4) at the other terminal:

$$R^1(OCHR^2CH_2)_nOH \tag{1}$$

wherein $R^1$ is an alkyl group having 1 to 4 carbon atoms; $R^2$ is a hydrogen atom or a methyl group; n is an integer of 7 to 30; and the end-capping compound (T1) capping one terminal of the polycarbodiimide compound (A1) and the end-capping compound (T1) capping the other terminal thereof, and the end-capping compound (T1) capping one terminal of the polycarbodiimide compound (A2) may be the same or different from each other, the end-capping compounds (T2), (T3), and (T4) are each independently a compound having one amino group, isocyanate group, epoxy group, or carboxy group, or a compound having one hydroxyl group other than the end-capping compound (T1), a total content of an oxyalkylene group ($OCHR^2CH_2$) in the polycarbodiimide compound (A) is 15% by mass or more, a total content of an oxyalkylene group in the polycarbodiimide compounds (A) and (B) based on a total amount of the polycarbodiimide compounds (A) and (B) is 10% by mass or less, and a content of the surfactant (C) is 0.1 to 20 parts by mass based on a total content of the polycarbodiimide compounds (A) and (B) of 100 parts by mass.

[2] The waterborne resin crosslinking agent according to the above [1], wherein the polycarbodiimide compound (A) is the polycarbodiimide compound (A1).

[3] The waterborne resin crosslinking agent according to the above [1], wherein the polycarbodiimide compound (A) is a mixture of the polycarbodiimide compound (A1) and the polycarbodiimide compound (A2).

[4] The waterborne resin crosslinking agent according to any one of the above [1] to [3], wherein the end-capping compound (T1) capping one terminal of the polycarbodiimide compound (A1) and the end-capping compound (T1) capping the other terminal thereof are the same.

[5] The waterborne resin crosslinking agent according to any one of the above [1] to [4], wherein the end-capping compounds (T3) and (T4) are the same.

[6] The waterborne resin crosslinking agent according to any one of the above [1] to [5], wherein the end-capping compound (T1) is polyethylene glycol monomethyl ether.

[7] The waterborne resin crosslinking agent according to any one of the above [1] to [6], wherein the surfactant (C) is one or more selected from the group consisting of an anionic surfactant and a nonionic surfactant.

[8] A waterborne resin crosslinking agent-containing liquid comprising the waterborne resin crosslinking agent according to any one of the above [1] to [7] and an aqueous medium.

[9] The waterborne resin crosslinking agent-containing liquid according to the above [8], wherein the aqueous medium is water or a mixed solvent of water and a hydrophilic solvent.

[10] A waterborne resin composition comprising the waterborne resin crosslinking agent according to any one of the above [1] to [7] and a waterborne resin.

[11] The waterborne resin composition according to the above [10], wherein the waterborne resin has a group selected from the group consisting of a carboxy group, an amino group, and a hydroxyl group.

[12] The waterborne resin composition according to the above [10] or [11], wherein the waterborne resin is one or more selected from the group consisting of a polyester resin, an acrylic resin, a polyurethane resin, an epoxy resin, a styrene-acrylic resin, a melamine resin, a polyolefin resin, and a fluororesin.

[13] The waterborne resin composition according to any one of the above [10] to [12], wherein the waterborne resin composition is used for an adhesive, a fiber treatment agent, a coating agent, or a paint.

[14] The waterborne resin composition according to the above [13], wherein the paint is for wet-on-wet coating.

[15] A resin film formed from the waterborne resin composition according to any one of the above [10] to [14].

[16] An article obtained by forming the resin film according to the above [15] on a base material.

Advantageous Effects of Invention

The waterborne resin crosslinking agent of the present invention is excellent in the storage stability when the crosslinking agent and the waterborne resin are caused to coexist. Because of this, use of the waterborne resin crosslinking agent can provide a waterborne resin composition having excellent storage stability. Moreover, according to the waterborne resin crosslinking agent, the water resistance, the solvent resistance, and the water-resistant adhesion of a cured product of the waterborne resin can be improved. Therefore, the waterborne resin composition including the waterborne resin crosslinking agent can be preferably used for applications such as an adhesive, a fiber treatment agent, a coating agent, and a paint.

In addition, the waterborne resin crosslinking agent-containing liquid using the waterborne resin crosslinking agent is excellent in convenience when a crosslinking agent is used for crosslinking a waterborne resin.

DESCRIPTION OF EMBODIMENTS

Hereinafter, the waterborne resin crosslinking agent, and the waterborne resin crosslinking agent-containing liquid and the waterborne resin composition comprising the same according to the present invention will be described in detail.

"Waterborne" as used in the present invention means having solubility or dispersibility in an aqueous medium. The "aqueous medium" refers to water and/or a hydrophilic solvent. The "polycarbodiimide compound" refers to a compound having two or more carbodiimide groups.

[Waterborne Resin Crosslinking Agent]

The waterborne resin crosslinking agent of the present invention includes a polycarbodiimide compound (A), a polycarbodiimide compound (B), and a surfactant (C). That is, the waterborne resin crosslinking agent includes two polycarbodiimide compounds (A) and (B), and a surfactant (C).

According to the waterborne resin crosslinking agent having such a blending composition, the storage stability when it is caused to coexist with a waterborne resin is excellent, and the water resistance, the solvent resistance, and water-resistant adhesion of a cured product of the waterborne resin can be improved.

(Polycarbodiimide Compounds (A) and (B))

The polycarbodiimide compound (A) is one or more selected from the group consisting of a polycarbodiimide compound (A1) and a polycarbodiimide compound (A2). The polycarbodiimide compound (A) may be only one of the polycarbodiimide compound (A1) or the polycarbodiimide compound (A2), or may include two or more selected from the group consisting of these.

The polycarbodiimide compound (A1) has a structure in which an isocyanate group is capped with an end-capping compound (T1) at both terminals. The polycarbodiimide compound (A2) has a structure in which an isocyanate group is capped with an end-capping compound (T1) at one terminal and has a structure in which an isocyanate group is end-capped with an end-capping compound (T2) at the other terminal. The polycarbodiimide compound (B) has a structure in which an isocyanate group is capped with an end-capping compound (T3) at one terminal and has a structure in which an isocyanate group is end-capped with an end-capping compound (T4) at the other terminal.

The end-capping compound (T1) is represented by the following general formula (1).

$$R^1(OCHR^2CH_2)_nOH \quad (1)$$

In the formula (1), $R^1$ is an alkyl group having 1 to 4 carbon atoms, preferably a methyl group or an ethyl group, and more preferably a methyl group. $R^2$ is a hydrogen atom or a methyl group, and preferably a hydrogen atom.

n is an integer of 7 to 30, preferably an integer of 7 to 25, and more preferably an integer of 8 to 20 in view of the hydrophilicity of the polycarbodiimide compound (A), the miscibility with the waterborne resin, and the like. The end-capping compound (T1) may be a mixture of compounds represented by the formula (1) wherein n is any of an integer of 7 to 30.

Examples of the end-capping compound (T1) include polyethylene glycol monomethyl ether, polyethylene glycol monoethyl ether, polypropylene glycol monomethyl ether, and polypropylene glycol monoethyl ether in view of handleability, availability, and the like, and in particular, polyethylene glycol monomethyl ether is preferably used. These may be used singly or in combinations of two or more.

The molecular weight of the end-capping compound (T1) is preferably 340 to 1800, more preferably 350 to 1500, and further preferably 400 to 1000 in view of the hydrophilicity of the polycarbodiimide compound (A), the miscibility with the waterborne resin, and the like.

The polycarbodiimide compound (A) is preferably the polycarbodiimide compound (A1) in view of imparting hydrophilicity.

The end-capping compound (T1) capping one terminal of the polycarbodiimide compound (A1) and the end-capping compound (T1) capping the other terminal thereof, and the end-capping compound (T1) capping one terminal of the polycarbodiimide compound (A2) may be different from each other, but are preferably the same in view of ease of production of the polycarbodiimide compound (A1).

As the polycarbodiimide compound (A), a mixture of the polycarbodiimide compound (A1) and the polycarbodiimide compound (A2) can also be preferably used.

The end-capping compounds (T2), (T3), and (T4) are each independently a compound having one amino group, isocyanate group, epoxy group, or carboxy group, or a compound having one hydroxyl group other than the end-capping compound (T1). Any of these groups reacts with the terminal isocyanate group to provide an end-capped polycarbodiimide compound. Only one of these, or two or more of these may be included. The end-capping compounds (T2), (T3), and (T4) may be the same or different from each other. The end-capping compounds (T3) and (T4) are preferably the same in view of ease of production of the polycarbodiimide compound (B).

Examples of the compound having one amino group used as any of the end-capping compounds (T2), (T3), and (T4) include monoamines having a hydrocarbon group having 1 to 18 carbon atoms. Specific examples thereof include methylamine, ethylamine, propylamine, butylamine, pentylamine, hexylamine, octylamine, dodecylamine, diethylamine, dipropylamine, dibutylamine, cyclohexylamine, adamantanamine, allylamine, polyoxyethylene laurylamine, polyoxyethylene stearylamine, aniline, diphenylamine, 3-aminopropyltrimethoxysilane, 3-aminopropyltriethoxysilane, N-phenyl-3-aminopropyltrimethoxysilane, 2,2-difluoroamine, fluorobenzylamine, trifluoroethylamine, [[4-(trifluoromethyl)cyclohexyl]methyl]amine, isopropanolamine, N,N-diethylisopropanolamine, and derivatives thereof. Of these, cyclohexylamine, N,N-diethylisopropanolamine, and the like are preferably used in view of versatility and the like. These may be used singly or in combinations of two or more.

Examples of the compound having one isocyanate group used as any of the end-capping compounds (T2), (T3), and (T4) include monoisocyanates having a hydrocarbon group having 1 to 18 carbon atoms. Specific examples thereof include butyl isocyanate, pentyl isocyanate, hexyl isocyanate, octyl isocyanate, dodecyl isocyanate, cyclohexyl isocyanate, 1-adamantyl isocyanate, 3-isocyanate propyltriethoxysilane, 2-isocyanatoethyl acrylate, benzyl isocyanate, 2-phenylethyl isocyanate, and derivatives thereof. Of these, cyclohexyl isocyanate and the like are preferably used in view of reactivity and the like. These may be used singly or in combinations of two or more.

Examples of the compound having one epoxy group used as any of the end-capping compounds (T2), (T3), and (T4) include monoepoxydes such as 1,2-epoxy heptane, 1,2-epoxy hexane, 1,2-epoxy decane, 1,2-epoxy-5-hexene, ethyl glycidyl ether, 2-ethylhexyl glycidyl ether, glycidyl lauryl ether, allyl glycidyl ether, diethoxy(3-glycidyloxypropyl)methylsilane, 3-[2-(perfluorohexyl)ethoxy]-1,2-epoxypropane, and derivatives thereof. These may be used singly or in combinations of two or more.

Examples of the compound having a carboxy group used as any of the end-capping compounds (T2), (T3), and (T4) include monocarboxylic acids having a hydrocarbon group having 1 to 18 carbon atoms. Specific examples thereof include acetic acid, propionic acid, butanoic acid, pentanoic acid, hexanoic acid, heptanoic acid, octanoic acid, nonanoic acid, decanoic acid, cyclohexanecarboxylic acid, adamantaneacetic acid, phenylacetic acid, benzoic acid, undecenoic acid, and derivatives thereof. These may be used singly or in combinations of two or more.

Examples of the compound having one hydroxyl group used as any of the end-capping compounds (T2), (T3), and (T4) include monoalcohols having a hydrocarbon group having 1 to 18 carbon atoms and polyalkylene glycol monohydrocarbyl ether. However, the polyalkylene glycol monohydrocarbyl ether is a compound other than the end-capping compound (T1). Specific examples thereof include cyclohexanol, methyl glycolate, oleyl alcohol, benzyl alcohol, polyethylene glycol monomethyl ether, polyethylene glycol monoethyl ether, polypropylene glycol monomethyl ether, polypropylene glycol monoethyl ether, polypropylene glycol monophenyl ether, tetraethylene glycol monomethyl ether, tetraethylene glycol monoethyl ether, triethylene glycol monomethyl ether, triethylene glycol monoethyl ether, diethylene glycol monomethyl ether, diethylene glycol monoethyl ether, dodecyl alcohol, octanol, hexanol, pentanol, butanol, propanol, ethanol, N,N-dimethylisopropanolamine, and N,N-diethylisopropanolamine. Of these, isopropanol, methyl glycolate, oleyl alcohol, benzyl alcohol, N,N-diethylisopropanolamine, and the like are preferably used in view of reactivity, versatility, and the like. These may be used singly or in combinations of two or more.

In view of storage stability, the end-capping compounds (T2), (T3), and (T4) are each preferably a compound in which a moiety excluding the amino group, the isocyanate group, the epoxy group, the carboxy group, or the hydroxyl group, which reacts with the terminal isocyanate group, consists only of a hydrocarbon. Among them, the group that reacts with the terminal isocyanate group is preferably an amino group, an isocyanate group, or a hydroxyl group, and more preferably an amino group or an isocyanate group.

In the waterborne resin crosslinking agent, the total content of the oxyalkylene group ($OCHR^2CH_2$) in the polycarbodiimide compound (A) is 15% by mass or more, preferably 20% by mass or more, and more preferably 30% by mass or more in view of imparting hydrophilicity to the polycarbodiimide compound (A). The total content is preferably 50% by mass or less in view of causing the carbodiimide group in the polycarbodiimide compound (A) to exert a sufficient action as a crosslinkable group.

In the waterborne resin crosslinking agent, the total content of the oxyalkylene group in the polycarbodiimide compounds (A) and (B) based on the total amount of the polycarbodiimide compounds (A) and (B) is 10% by mass or less, preferably 0.2 to 10.0% by mass, more preferably 0.25 to 6.0% by mass, and further preferably 0.3 to 5.0% by mass.

When the total content exceeds 10.0% by mass, the storage stability of the waterborne resin composition including the crosslinking agent decreases, and the water resistance, the solvent resistance, and the water-resistant adhesion of a cured product of the waterborne resin are also poor.

The total content is preferably 5.0% by mass or less in view of improving the water-resistant adhesion of a cured product of the waterborne resin.

The content of each of the polycarbodiimide compounds (A) and (B) in the waterborne resin crosslinking agent is set according to the total content of the oxyalkylene group described above, and the content of the polycarbodiimide compound (A) in 100 parts by mass in total of the polycarbodiimide compounds (A) and (B) is preferably 0.5 to 25 parts by mass, more preferably 1 to 20 parts by mass, and further preferably 1 to 10 parts by mass in view of improving the water resistance, the solvent resistance, and the water resistant adhesion of a cured product of the waterborne resin.

(Method for Producing Polycarbodiimide Compounds (A) and (B))

The polycarbodiimide compounds (A) and (B) can be obtained, for example, by synthesizing an isocyanate-terminated polycarbodiimide compound having an isocyanate group at each of both terminals by a known reaction such as decarbonation condensation reaction of an diisocyanate compound and then or at the same time reacting it with a predetermined end-capping compound to cap the terminal isocyanate groups.

The diisocyanate compound is not particularly limited, and may be any of a chain or alicyclic aliphatic diisocyanate compound, an aromatic diisocyanate compound, or a heterocyclic diisocyanate compound, and these may be used singly or in combinations of two or more. Alternatively or additionally to the diisocyanate compound, a compound having three or more isocyanate groups can also be used as a starting material for the reaction.

Examples of the chain aliphatic diisocyanate compound include tetramethylene diisocyanate, hexamethylene diisocyanate, dodecamethylene diisocyanate, and 2,2,4-trimethylhexamethylene diisocyanate.

Examples of the alicyclic diisocyanate compound include 1,3-bis(isocyanatomethyl)cyclohexane, 1,4-bis(isocyanatomethyl)cyclohexane, 2,2-bis(4-isocyanatocyclohexyl) propane, isophorone diisocyanate, and dicyclohexylmethane-4,4'-diisocyanate.

Examples of the aromatic diisocyanate compound include toluene-2,4-diisocyanate, diphenylmethane-2,2'-diisocyanate, diphenylmethane-2,4'-diisocyanate, diphenylmethane-4,4'-diisocyanate, and 2,4,6-triisopropylbenzene-1,3-diyl diisocyanate.

Examples of the aliphatic diisocyanate compound including an aromatic ring include m-xylylene diisocyanate and 1,3-bis(2-isocyanato-2-propyl)benzene (common name: tetramethylxylylene diisocyanate).

Of these, in view of availability, ease of synthesizing the polycarbodiimide compound, and the like, hexamethylene diisocyanate, isophorone diisocyanate, dicyclohexylmethane-4,4'-diisocyanate, m-xylylene diisocyanate, and tetramethylxylylene diisocyanate are preferable, and in particular, dicyclohexylmethane-4,4'-diisocyanate is preferably used.

The decarboxylation condensation reaction of the diisocyanate compound is preferably carried out in the presence of a carbodiimidization catalyst. Examples of the carbodiimidization catalyst include phosphorene oxides such as 1-phenyl-2-phosphorene-1-oxide, 3-methyl-1-phenyl-2-phosphorene-1-oxide, 1-ethyl-2-phosphorene-1-oxide, 3-methyl-2-phosphorene-1-oxide, and 3-phosphorene isomers thereof. Of these, 3-methyl-1-phenyl-2-phosphorene-1-oxide is preferable in view of reactivity.

The amount of the carbodiimidization catalyst used is usually preferably 0.01 to 2.0 parts by mass per 100 parts by mass of the diisocyanate compound.

The decarboxylation condensation reaction of the diisocyanate compound can be carried out in a solvent or in the absence of a solvent. Examples of the solvent used include an alicyclic ether such as tetrahydrofuran, 1,3-dioxane, or dioxolane; an aromatic hydrocarbon such as benzene, toluene, xylene, or ethylbenzene; a halogenated hydrocarbon such as chlorobenzene, dichlorobenzene, trichlorobenzene, Perclene, trichloroethane, or dichloroethane; cyclohexanone; propylene glycol monomethyl ether acetate, and diethylene glycol diethyl ether. These may be used singly or in combinations of two or more.

When the reaction is carried out in a solvent, the concentration of the diisocyanate compound is preferably 5 to 55% by mass, and more preferably 5 to 20% by mass.

The conditions of the decarboxylation condensation reaction are not particularly limited, and the reaction temperature is preferably 40 to 250° C., and more preferably 80 to 195° C. When the reaction is carried out in a solvent, the temperature is preferably in the range of 40° C. to the boiling point of the solvent.

The reaction time is preferably 0.5 to 80 hours, and more preferably 1 to 70 hours.

The reaction is preferably carried out in an atmosphere of an inert gas such as nitrogen gas or a noble gas.

The reaction between the isocyanate-terminated polycarbodiimide compound and the end-capping compound can be carried out by heating the isocyanate-terminated polycarbodiimide compound to preferably 50 to 200° C. and more preferably 100 to 180° C., then adding the end-capping compound, and reacting them at about 80 to 200° C. for about 0.5 to 5 hours.

When the isocyanate-terminated polycarbodiimide is synthesized, the end-capping compound may be added at the same time for reaction, and in this case, the heating temperature is preferably 40 to 200° C. and more preferably 80 to 195° C.; and the polycarbodiimide compound (A) or (B) can be obtained by the reaction for about 10 to 70 hours.

The polycarbodiimide compound (A2) is produced by reacting the terminal isocyanate groups of the isocyanate-terminated polycarbodiimide compound so as to be capped with the end-capping compounds (T1) and (T2).

For example, the polycarbodiimide compound (A2) is obtained by adding, to the diisocyanate compound, the end-capping compound (T1) or (T2) in an equimolar amount (theoretical amount) to the target polycarbodiimide compound (A2), and a carbodiimidization catalyst, reacting them to obtain a polycarbodiimide compound in which some of the isocyanate groups are capped with the end-capping compound (T1) or (T2), and then reacting it with the end-capping compound (T2) or (T1), different from the above end-capping compound, in an equimolar amount (theoretical amount) to the uncapped terminal isocyanate groups of the obtained polycarbodiimide compound.

The polycarbodiimide compound (A2) can also be obtained by simultaneously adding, to the diisocyanate compound, the end-capping compounds (T1) and (T2) each in an equimolar amount to the target polycarbodiimide compound (A2), and a carbodiimidization catalyst, and reacting them.

Alternatively, the polycarbodiimide compound (A2) can also be obtained by obtaining an isocyanate-terminated polycarbodiimide compound having an isocyanate group at each of both terminals, then adding the end-capping compound (T1) or (T2) in an equimolar amount (theoretical amount) to the isocyanate-terminated polycarbodiimide compound, reacting them to obtain a polycarbodiimide compound in which some of the isocyanate groups are capped with the end-capping compound (T1) or (T2), and then reacting it with the end-capping compound (T2) or (T1), different from the above end-capping compound, in an equimolar amount (theoretical amount) to the uncapped terminal isocyanate groups of the obtained polycarbodiimide compound.

The polycarbodiimide compound (A2) can also be obtained by obtaining an isocyanate-terminated polycarbodiimide compound having an isocyanate group at each of both terminals, then simultaneously adding the end-capping compounds (T1) and (T2) each in an equimolar amount (theoretical amount) to the isocyanate-terminated polycarbodiimide compound, and react them.

In the synthesis of the polycarbodiimide compound (A2) as described above, the polycarbodiimide compound (A1) may also be produced as a by-product in addition to the polycarbodiimide compound (A2), which is the main product. A compound in which the isocyanate groups at both terminals are capped with the terminal compound (T2) (corresponding to the polycarbodiimide compound (B)) may also be produced as a by-product. However, it is practically difficult to separate these by-products and determine the amounts thereof produced. Because of this, herein, the polycarbodiimide compound obtained by a production method for obtaining the polycarbodiimide compound (A2) as described above is regarded as the polycarbodiimide compound (A2).

The degree of polymerization of the polycarbodiimide compounds (A) and (B) (degree of polymerization of the carbodiimide group) is not particularly limited, and is preferably 1 to 30, more preferably 2 to 25, and further preferably 3 to 20 in view of preventing gelation of the polycarbodiimide compounds in an aqueous medium.

The "degree of polymerization of the carbodiimide group" as used herein refers to the number of carbodiimide groups produced by the decarboxylation condensation reaction between the diisocyanate compounds in the polycarbodiimide compound and is expressed as the average degree of polymerization.

<Surfactant (C)>

The surfactant (C) is blended in view of uniform dissolution or dispersion of the polycarbodiimide compounds (A) and (B) in an aqueous medium, the storage stability of the waterborne resin composition, and the like. In addition, the addition of an appropriate amount of the surfactant (C) also contributes to improvement in the water resistance, the solvent resistance, and the water-resistant adhesion of a cured product of the waterborne resin.

The content of the surfactant (C) in the waterborne resin crosslinking agent is 0.1 to 20 parts by mass.

If the content is less than 0.1 parts by mass, an aggregate may be formed in the waterborne resin composition including the crosslinking agent, or the storage stability may be insufficient. On the other hand, when the content exceeds 20.0 parts by mass, the storage stability of the waterborne resin composition including the crosslinking agent decreases, and the water resistance, the solvent resistance, and the water-resistant adhesion of a cured product of the waterborne resin are also poor.

The content is preferably 0.5 parts by mass or more in view of improving the water resistance, the solvent resistance, and the water-resistant adhesion of a cured product of the waterborne resin. The content is preferably 10 parts by mass or less, more preferably 8 parts by mass or less, and further preferably 5 parts by mass or less.

The surfactant (C) is preferably an anionic surfactant or a nonionic surfactant in view of the storage stability of the waterborne resin composition including the crosslinking agent and the water resistance, the solvent resistance, and the water adhesion of a cured product of the waterborne resin. These may be used singly or in combinations of two or more.

Examples of the anionic surfactant include sodium dodecylbenzenesulfonate, sodium dodecyl sulfate, sodium lauryl sulfate, sodium N-cocoyl methyl taurate, sodium di-2-ethylhexyl sulfosuccinate, sodium 2-ethylhexyl sulfate, and α-sulfo fatty acid methyl ester sodium salt. Of these, sodium dodecylbenzenesulfonate is preferably used in view of availability and the like.

Examples of the nonionic surfactant include polyoxyethylene-2-ethylhexyl ether, polyethylene glycol monomethyl ether, and polyoxyethylene isodecyl ether. The molecular weight of these nonionic surfactants is preferably 100 to 2000, and, in view of ease of addition and mixing and the like, is more preferably 100 to 1000, and further preferably 300 to 1000.

(Other Components)

In addition to the polycarbodiimide compounds (A) and (B) and the surfactant (C), the waterborne resin crosslinking agent may include a solvent, and an additive such as an antioxidant, an ultraviolet absorber, a thickener, an antifoaming agent, and a wettability improver as long as it does not impair the effect of the present invention. In this case, the total content of the polycarbodiimide compounds (A) and (B) blended in the waterborne resin crosslinking agent is preferably 85% by mass or more, more preferably 90% by mass or more, and further preferably 95% by mass or more in view of efficiently exerting the crosslinking action.

(Method for Producing Waterborne Resin Crosslinking Agent)

The waterborne resin crosslinking agent can be produced by stirring and mixing the polycarbodiimide compound (A), the polycarbodiimide compound (B), the surfactant (C), and the additive(s) and the like as the above other components, if necessary. When these are mixed, an aqueous medium may be used to produce the waterborne resin crosslinking agent in advance as a waterborne resin crosslinking agent-containing liquid described later.

The method of stirring and mixing for obtaining the waterborne resin crosslinking agent is not particularly limited, and stirring and mixing can be carried out, for example by a known method using a rotating blade, a magnetic stirrer, or the like.

Conditions such as temperature and time at the time of mixing differ depending on, for example, the types of the polycarbodiimide compound (A), the polycarbodiimide compound (B), the surfactant (C), and the like. For example, the polycarbodiimide compounds (A) and (B) for the waterborne resin crosslinking agent are preferably mixed at 60 to 200° C. for 1 to 48 hours, followed by stirring and mixed the resultant with the surfactant (C) at 50 to 100° C. for 0.5 to 4 hours, in view of efficient and uniform mixing.

[Waterborne Resin Crosslinking Agent-Containing Liquid]

The waterborne resin crosslinking agent-containing liquid of the present invention includes the waterborne resin crosslinking agent and an aqueous medium. Preparation of the waterborne resin crosslinking agent as a liquid containing the same facilitates uniform addition to and mixing with the waterborne resin to be crosslinked, which can provide excellent handleability.

(Aqueous Medium)

As the aqueous medium, a medium that can uniformly dissolve or disperse each component contained in the waterborne resin crosslinking agent is used, and examples thereof include hydrophilic solvents among water, alcohols, ethers, ketones, esters, and the like. These may be used singly or in combinations of two or more. Of these, water or a mixed solvent of water and a hydrophilic solvent is preferable, and water only is preferable in view of environmental consideration, cost, and the like.

Examples of the alcohols include methanol, isopropanol, n-butanol, 2-ethylhexyl alcohol, ethylene glycol, and propylene glycol. Examples of the ethers include ethylene glycol monoethyl ether, ethylene glycol monobutyl ether, ethylene glycol monohexyl ether, propylene glycol monoethyl ether, 3-methoxy-3-methylbutanol, diethylene glycol monomethyl ether, diethylene glycol monoethyl ether, and tetrahydrofuran. Examples of the ketones include methyl isobutyl ketone, cyclohexanone, isophorone, and acetylacetone. Examples of the esters include ethylene glycol monoethyl ether acetate and ethylene glycol monobutyl ether acetate.

(Waterborne Resin Crosslinking Agent)

The concentration of the waterborne resin crosslinking agent in the waterborne resin crosslinking agent-containing liquid is appropriately determined in view of handleability in uniform addition to and mixing with the waterborne resin and the efficiency of the crosslinking action, and is preferably 10 to 100% by mass, more preferably 20 to 80% by mass, and further preferably 30 to 50% by mass.

(Other Components)

In addition to the waterborne resin crosslinking agent and the aqueous medium, the waterborne resin crosslinking agent-containing liquid may include an additive such as a solvent, an antioxidant, an ultraviolet absorber, an antioxidant, a thickener, an antifoaming agent, and a wettability improver as long as it does not impair the effect of the present invention.

(Method for Producing Waterborne Resin Crosslinking Agent-Containing Liquid)

The waterborne resin crosslinking agent-containing liquid can be produced by mixing the waterborne resin crosslinking agent, the aqueous medium, if necessary, an additive among other components, and the like. The method of stirring and mixing is not particularly limited, and stirring and mixing can be carried out, for example by a known method using a rotating blade, a magnetic stirrer, or the like.

Conditions such as temperature and time at the time of mixing differ depending on the composition of the waterborne resin crosslinking agent, the type of the aqueous medium, and the like, and for example, when the waterborne resin crosslinking agent and the aqueous medium are mixed, it is preferable to stir and mix them at 20 to 100° C. for 0.5 to 5 hours in view of efficient and uniform mixing.

[Waterborne Resin Composition]

The waterborne resin composition of the present invention includes the waterborne resin crosslinking agent and a waterborne resin. The waterborne resin composition includes the waterborne resin crosslinking agent of the present invention having excellent storage stability in a state in which it is included with the waterborne resin, and thus the crosslinking reaction by heating or the like can be carried out even after a long period of time has passed since the production. In addition, a cured product of a waterborne resin having excellent water resistance, solvent resistance, and water resistant adhesion can be obtained by using the waterborne resin composition.

(Waterborne Resin)

The waterborne resin is a resin having water solubility or water dispersibility. The waterborne resin can be crosslinked by a carbodiimide group, and is particularly preferably one having a hydrophilic crosslinkable group.

Specifically, the waterborne resin preferably has a group selected from the group consisting of a carboxy group, an amino group, and a hydroxyl group, which are each a hydrophilic group, and more preferably has an alcoholic hydroxyl group and/or a carboxy group as a crosslinkable group. Examples of the waterborne resin include a polyester resin, an acrylic resin, a polyurethane resin, an epoxy resin, a styrene-acrylic resin, a melamine resin, a polyolefin resin, and a fluororesin, which have such a crosslinkable group. These may be used singly or in combinations of two or more. Of these, an acrylic resin and a polyurethane resin are particularly preferably used.

(Waterborne Resin Crosslinking Agent)

The content of the waterborne resin crosslinking agent in the waterborne resin composition is appropriately determined according to the type of the waterborne resin, the physical properties required for the cured product of the waterborne resin, and the like, and is preferably 0.5 to 40 parts by mass, more preferably 1 to 30 parts by mass, and further preferably 1.5 to 20 parts by mass per 100 parts by mass of the waterborne resin in view of a balance between crosslinking reactivity and cost and the like.

(Other Components)

In addition to the waterborne resin crosslinking agent and the waterborne resin, the waterborne resin composition may include other additive components as long as it does not impair the effect of the present invention. Specifically, solvents and various additive components such as a colorant, a filler, a dispersant, a plasticizer, a thickener, an ultraviolet absorber, and an antioxidant may be included in the waterborne resin composition, if necessary, depending on the intended use, the application, and the like.

(Method for Producing Waterborne Resin Composition)

The waterborne resin composition can be produced by stirring and mixing the waterborne resin crosslinking agent, the aqueous medium, if necessary, other additive components, and the like. The method of stirring and mixing is not particularly limited, and stirring and mixing can be carried out, for example by a known method using a rotating blade, a magnetic stirrer, or the like.

Conditions such as temperature and time at the time of mixing differ depending on the composition of the waterborne resin crosslinking agent, the type of the waterborne resin, and the like, and the mixing temperature is preferably 0 to 100° C. and more preferably 10 to 50° C. in view of efficient and uniform mixing. In view of reactivity and mixing efficiency of the waterborne resin crosslinking agent, the waterborne resin, the additive, and the like, the temperature is more preferably 20 to 30° C. The mixing time is preferably 0.1 to 2 hours and more preferably 0.3 to 1 hour.

The waterborne resin composition may be produced by mixing with the waterborne resin as the waterborne resin crosslinking agent-containing liquid as described above in view of uniform mixing with the waterborne resin, ease of handling, and the like.

(Cured Product of Waterborne Resin)

Heating the waterborne resin composition causes crosslinking reaction to provide a cured product of the waterborne resin.

The heating temperature for curing the waterborne resin composition is appropriately set in view of promoting the crosslinking reaction within a range in which the waterborne resin composition is not discolored or thermally decomposed depending on the composition of the waterborne resin crosslinking agent, the type of the waterborne resin, and the like.

The waterborne resin composition produces a cured product of the waterborne resin having excellent water resistance, solvent resistance, and water-resistant adhesion, and thus can be preferably used in various applications such as a paint, an ink, a fiber treatment agent, an adhesive, a coating agent, and a shaped product, and is particularly preferable for an adhesive, a fiber treatment agent, a coating agent, and a paint.

For example, when the waterborne resin composition is used as an adhesive, excellent water-resistant adhesion can be obtained. When the waterborne resin composition is used as a paint, a cured coating film having excellent water resistance and solvent resistance can be obtained because of the waterborne resin, and the waterborne resin composition can also be preferably applied to wet-on-wet coating. In the wet-on-wet coating, the coating film (resin film) formed from the waterborne resin composition is less likely to cause bleeding or poor adhesion between the laminated coating films because of promoted crosslinking reaction, and a good coating film can be efficiently formed.

The waterborne resin composition can also exhibit various other physical properties based on excellent crosslinkability, and for example, an article obtained by forming the resin film on a base material can also be applied to applications that require high tensile strength and excellent heat resistance, durability, adhesion, close adhesion, chipping resistance, scratch resistance, and compatibility. Specifically, the waterborne resin composition can be preferably applied in fields such as an automobile, construction, heavy-duty anticorrosion coating, food packaging, and healthcare.

EXAMPLES

Hereinafter, the present invention will be described in detail with reference to Examples, but the present invention is not limited thereto.

[Synthesis of Polycarbodiimide Compounds (A) and (B)]

First, each polycarbodiimide compound used in the following Examples and Comparative Examples was synthesized.

The diisocyanate compounds and end-capping compounds used in the following Synthesis Examples are shown below.

The molecular weight herein is a calculated value or a catalog value.

<Diisocyanate Compounds>
  HMDI: Dicyclohexylmethane-4,4'-diisocyanate
  HDI: Hexamethylene diisocyanate
  XDI: m-Xylylene diisocyanate
  IPDI: Isophorone diisocyanate <End-Capping Compounds>
  MP(550): Polyethylene glycol monomethyl ether (molecular weight of 550)
  MP(400): Polyethylene glycol monomethyl ether (molecular weight of 400)
  MP(500): Polyethylene glycol monomethyl ether (molecular weight of 500)
  CHI: Cyclohexyl isocyanate (molecular weight of 125.17)
  CHA: Cyclohexylamine (molecular weight of 99.17)
  AA: N,N-diethylisopropanolamine (molecular weight of 131.58)
  IPA: Isopropanol (molecular weight of 60.10)
  GM: Methyl glycolate (molecular weight of 90.08)
  BzOH: Benzyl alcohol (molecular weight of 108.14)
  C18OH: Oleyl alcohol (molecular weight of 268.48)

Each analysis in the following Synthetic Examples was carried out by the following apparatuses and method.

<Infrared Absorption (IR) Spectrum>
  Measuring apparatus: "FTIR-8200PC," manufactured by Shimadzu Corporation <Amount of Terminal Isocyanate Group>
  Apparatus used: Automatic titrator "COM-900," manufactured by Hiranuma Sangyo Co., Ltd.
  A solution of di-n-butylamine in toluene at a known concentration was added to react a terminal isocyanate group with di-n-butylamine. The remaining di-n-butylamine was neutralized and titrated with a hydrochloric acid standard solution, and the amount [% by mass] of the isocyanate group remaining (amount of terminal NCO) was calculated.

Synthesis Example A1-1

100 parts by mass of HMDI and 0.5 parts by mass of 3-methyl-1-phenyl-2-phosphorene-1-oxide as a carbodiimidization catalyst were placed in a reaction vessel equipped with a reflux tube and a stirrer and were stirred at 170° C. for 18 hours under a nitrogen gas flow to obtain an isocyanate-terminated polycarbodiimide compound that was a polymer of dicyclohexylmethane-4,4'-diisocyanate and had an isocyanate group at each of both terminals.

An absorption peak assigned to a carbodiimide group at a wavelength of around 2150 $cm^{-1}$ was confirmed by IR spectrum measurement. The amount of terminal NCO was 5.07% by mass (the degree of polymerization of the carbodiimide group was 6.4).

85.5 parts by mass of the obtained isocyanate-terminated polycarbodiimide compound was dissolved at 150° C., 56.7 parts by mass of MP(550) (2 mol per mol of the isocyanate-terminated polycarbodiimide compound) as the end-capping compound (T1) was added thereto, and the resulting mixture was heated to 180° C. and reacted for 2 hours under stirring. It was confirmed by IR spectrum measurement of the reaction product that the absorption peak assigned to the isocyanate group at a wavelength of 2200 to 2300 $cm^{-1}$ disappeared, and then the reaction product was taken out from the reaction vessel and cooled to room temperature (25° C.) to obtain a pale-yellow clear liquid polycarbodiimide compound (A1-1) (molecular weight of 2760).

Synthesis Example A1-2

The reaction time of the polymerization of HMDI in Synthesis Example A1-1 was changed to 16 hours, and an isocyanate-terminated polycarbodiimide compound having an amount of terminal NCO of 7.4% by mass (degree of polymerization of the carbodiimide group of 4.0) was thus obtained.

86.6 parts by mass of the obtained isocyanate-terminated polycarbodiimide compound was dissolved at 150° C., 84.0 parts by mass of MP(550) (2 mol per mol of the isocyanate-terminated polycarbodiimide compound) as the end-capping compound (T1) was added thereto, and the resulting mixture was heated to 180° C. and reacted for 2 hours under stirring. It was confirmed by IR spectrum measurement of the reaction product that the absorption peak assigned to the isocyanate group at a wavelength of 2200 to 2300 $cm^{-1}$ disappeared, and then the reaction product was taken out from the reaction vessel and cooled to room temperature (25° C.) to obtain a pale-yellow clear liquid polycarbodiimide compound (A1-2) (molecular weight of 2235).

Synthesis Example A1-3

An isocyanate-terminated polycarbodiimide compound having an amount of terminal NCO of 12.02% by mass (degree of polymerization of the carbodiimide group of 2.0) was obtained in the same manner as in Synthesis Example A1-1.

88.8 parts by mass of the obtained isocyanate-terminated polycarbodiimide compound was dissolved at 150° C., 139.7 parts by mass (2 mol per mol of the isocyanate-terminated polycarbodiimide compound) of MP(550) as the end-capping compound (T1) was added thereto, and thereafter in the same manner as in Synthesis Example A1-1, a pale-yellow clear liquid polycarbodiimide compound (A1-3) was obtained (molecular weight of 1799).

Synthesis Example A1-4

An isocyanate-terminated polycarbodiimide compound having an amount of terminal NCO of 3.77% by mass (degree of polymerization of the carbodiimide group of 9.0) was obtained in the same manner as in Synthesis Example A1-1.

88.8 parts by mass of the obtained isocyanate-terminated polycarbodiimide compound was dissolved at 150° C., 139.7 parts by mass of MP(550) (2 mol per mol of the isocyanate-terminated polycarbodiimide compound) as the end-capping compound (T1) was added thereto, and thereafter in the same manner as in Synthesis Example A1-1, a pale-yellow clear liquid polycarbodiimide compound (A1-4) was obtained (molecular weight of 3327).

Synthesis Example A1-5

A pale-yellow clear liquid polycarbodiimide compound (A1-5) was obtained (molecular weight of 2460) in the same manner as in Synthesis Example A1-1 except that 41.3 parts by mass of MP(400) (2 mol per mol of the isocyanate-terminated polycarbodiimide compound), instead of MP(550) in Synthesis Example A1-1, as the end-capping compound (T1) was added.

Synthesis Example A1-6

A pale-yellow clear liquid polycarbodiimide compound (A1-6) was obtained (molecular weight of 2660) in the same manner as in Synthesis Example A1-1 except that 51.5 parts by mass of MP(500) (2 mol per mol of the isocyanate-terminated polycarbodiimide compound), instead of MP(550) in Synthesis Example A1-1, as the end-capping compound (T1) was added.

Synthesis Example A2-1

100 parts by mass of HMDI, 6.4 parts by mass of CHI as the end-capping compound (T2), and 1.2 parts by mass of 3-methyl-1-phenyl-2-phosphorene-1-oxide as a carbodiimidization catalyst were placed in a reaction vessel equipped with a reflux tube and a stirrer and reacted at 180° C. for 47 hours under a nitrogen gas flow. It was confirmed by IR spectrum measurement of the reaction product that the absorption peak assigned to the isocyanate group at a wavelength of 2200 to 2300 $cm^{-1}$ decreased. A polycarbodiimide compound having an amount of terminal NCO of 2.54% by mass (degree of polymerization of the carbodiimide group of 6.4) was obtained.

This polycarbodiimide compound was heated to 160° C., 28.3 parts by mass of MP(550) (1.0 mol per mol of the isocyanate-terminated polycarbodiimide compound) as the end-capping compound (T1) was added thereto, and the resulting mixture was heated to 180° C. and reacted for 2 hours under stirring. It was confirmed by IR spectrum measurement of the reaction product that the absorption peak assigned to the isocyanate group at a wavelength of 2200 to 2300 $cm^{-1}$ disappeared, and then the reaction product was taken out from the reaction vessel and cooled to room temperature (25° C.) to obtain a pale-yellow clear liquid polycarbodiimide compound (A2-1) (molecular weight of 2291).

Synthesis Example A2-2

85.5 parts by mass of the isocyanate-terminated polycarbodiimide compound obtained in Synthesis Example A1-1 was dissolved at 150° C., 28.3 parts by mass of MP(550) (1.0 mol per mol of the isocyanate-terminated polycarbodiimide compound) as the end-capping compound (T1) was added thereto, and the resulting mixture was heated to 180° C. and reacted for 2 hours under stirring. Further, 6.75 parts by mass of AA (1.0 mol per mol of the isocyanate-terminated polycarbodiimide compound) as the end-capping compound (T2) was added, and the resulting mixture was heated to 180° C. and reacted for 2 hours under stirring. It was confirmed by IR spectrum measurement of the reaction product that the absorption peak assigned to the isocyanate group at a wavelength of 2200 to 2300 $cm^{-1}$ disappeared, and then the reaction product was taken out from the reaction vessel and cooled to room temperature (25° C.) to obtain a pale-yellow clear liquid polycarbodiimide compound (A2-2) (molecular weight of 2341).

Synthesis Example A2-3

A pale-yellow clear liquid polycarbodiimide compound (A2-3) was obtained (molecular weight of 2318) in the same manner as in Synthesis Example A2-2 except that 5.57 parts by mass of BzOH (1 mol per mol of the isocyanate-terminated polycarbodiimide compound), instead of AA in Synthesis Example A2-2, as the end-capping compound (T2) was added.

Synthesis Example B-1

100 parts by mass of HMDI, 23.9 parts by mass of CHI as the end-capping compounds (T3) and (T4), and 1.2 parts by mass of 3-methyl-1-phenyl-2-phosphorene-1-oxide as a carbodiimidization catalyst were placed in a reaction vessel equipped with a reflux tube and a stirrer and reacted at 180° C. for 47 hours under a nitrogen gas flow. It was confirmed by IR spectrum measurement of the reaction product that the absorption peak assigned to the isocyanate group at a wavelength of 2200 to 2300 $cm^{-1}$ disappeared, and then the reaction product was taken out from the reaction vessel and cooled to room temperature (25° C.) to obtain a pale-yellow clear liquid polycarbodiimide compound (B-1) (molecular weight of 1078).

Synthesis Examples B-2 and B-3

A pale-yellow clear liquid polycarbodiimide compound (B-2) or (B-3) was obtained in the same manner as in Synthesis Example B-1 except that the amount of CHI added in Synthesis Example B-1 was changed to 47.8 parts by mass or 10.6 parts by mass.

Synthesis Example B-4

100 parts by mass of HMDI and 0.5 parts by mass of 3-methyl-1-phenyl-2-phosphorene-1-oxide as a carbodiimidization catalyst were placed in a reaction vessel equipped with a reflux tube and a stirrer, stirred at 180° C. for 28 hours under a nitrogen gas flow, and cooled to 90° C. to obtain an isocyanate-terminated polycarbodiimide compound.

An absorption peak assigned to a carbodiimide group at a wavelength of around 2150 cm$^{-1}$ was confirmed by IR spectrum measurement. The amount of terminal NCO was 2.35% by mass (the degree of polymerization of the carbodiimide group was 15.2).

84.2 parts by mass of the obtained isocyanate-terminated polycarbodiimide compound was dissolved at 160° C., 4.7 parts by mass of CHA (2 mol per mol of the isocyanate-terminated polycarbodiimide compound) as the end-capping compounds (T3) and (T4) was added thereto, and the resulting mixture was heated to 180° C. and reacted for 1.5 hours under stirring. It was confirmed by IR spectrum measurement of the reaction product that the absorption peak assigned to the isocyanate group at a wavelength of 2200 to 2300 cm$^{-1}$ disappeared, and then the reaction product was taken out from the reaction vessel to obtain a pale-yellow clear liquid polycarbodiimide compound (B-4) (molecular weight of 3779). The obtained polycarbodiimide was cooled to room temperature (25° C.) and pulverized using a roll granulator.

Synthesis Examples B-5 to B-9

Polycarbodiimide compounds (B-5) to (B-9) were each obtained in the same manner as in Synthesis Example A1-1 except that 13.5 parts by mass of AA, 6.2 parts by mass of IPA, 27.7 parts by mass of C18OH, or 11.1 parts by mass of BzOH, instead of MP(550) in Synthesis Example A1-1, as the end-capping compounds (T3) and (T4) was added.

Synthesis Example B-10

100 parts by mass of HDI, 28.1 parts by mass of CHI as the end-capping compounds (T3) and (T4), 2.0 parts by mass of 3-methyl-1-phenyl-2-phosphorene-1-oxide as a carbodiimidization catalyst, and 100 parts by mass of diethylene glycol diethyl ether as a solvent were placed in a reaction vessel equipped with a reflux tube and a stirrer and stirred and mixed at 150° C. for 24 hours under a nitrogen gas flow to be reacted.

Thereafter, the solvent was distilled off under reduced pressure, and the reaction product was taken out from the reaction vessel and cooled to room temperature (25° C.) to obtain a pale-yellow clear liquid polycarbodiimide compound (B-10) (molecular weight of 702).

Synthesis Example B-11

A pale-yellow clear liquid polycarbodiimide compound (B-11) was obtained (molecular weight of 782) in the same manner as in Synthesis Example B-10 except that XDI was used instead of HDI in Synthesis Example B-10, and that the amount of CHI added was 33.3 parts by mass.

Synthesis Example B-12

100 parts by mass of IPDI, 28.1 parts by mass of CHI as the end-capping compounds (T3) and (T4), and 2.0 parts by mass of 3-methyl-1-phenyl-2-phosphorene-1-oxide as a carbodiimidization catalyst were placed in a reaction vessel equipped with a reflux tube and a stirrer and stirred and mixed at 150° C. for 24 hours under a nitrogen gas flow to be reacted. It was confirmed by IR spectrum measurement of the reaction product that the absorption peak assigned to the isocyanate group at a wavelength of 2200 to 2300 cm$^{-1}$ disappeared, and then the reaction product was taken out from the reaction vessel and cooled to room temperature (25° C.) to obtain a pale-yellow clear liquid polycarbodiimide compound (B-12) (molecular weight of 918).

[Preparation of Waterborne Resin Crosslinking Agent-Containing Liquid]

Details of the surfactant (C) used in the following Examples and Comparative Examples are as follows.
<Surfactants (C)>
C1: Sodium dodecylbenzenesulfonate, anionic
C2: Sodium N-cocoyl methyl taurate, anionic
C3: Sodium lauryl sulfate, anionic
C4: Sodium di-2-ethylhexyl sulfosuccinate, anionic
C5: Sodium 2-ethylhexyl sulfate, anionic
C6: α-Sulfo fatty acid methyl ester sodium salt, anionic
C7: Polyoxyethylene-2-ethylhexyl ether, nonionic
C8: Polyethylene glycol monomethyl ether (MP(550)), nonionic Example 1

1 part by mass of the polycarbodiimide compound (A1-1) and 99 parts by mass of the polycarbodiimide compound (B-1) were stirred and mixed at 160° C. for 4 hours and cooled to 80° C., 3 parts of mass (in terms of active component) of an aqueous solution of the surfactant (C1) (16% by mass of active component) was added thereto, and the resulting mixture was diluted with 150 parts by mass of ion-exchanged water and stirred and mixed to obtain a waterborne resin crosslinking agent-containing liquid.

Examples 2 to 45 and Comparative Examples 1 to 6

According to the compositions shown in Examples and Comparative Examples of Tables 1 to 3 below, the polycarbodiimide compounds (A) and (B) and the surfactant (C) were blended and diluted with ion-exchanged water in the same manner as in Example 1 to obtain a waterborne resin crosslinking agent-containing liquid.

The amounts of the surfactant (C) blended shown in Tables 1 to 3 are amounts in terms of the active component.

Comparative Example 7

In Example 1, the polycarbodiimide compound (A1-1) was not added, 50 parts by mass (in terms of active component) of an aqueous solution of the surfactant (C1) (16% by mass of active component) was added at 80° C. to 100 parts by mass of the polycarbodiimide compound (B-1), and the resulting mixture was diluted with 150 parts by mass of ion-exchanged water and stirred and mixed to obtain a waterborne resin crosslinking agent-containing liquid.

[Evaluation of Waterborne Resin Compositions]

Waterborne resin compositions were prepared using the waterborne resin crosslinking agent-containing liquids of the above Examples and Comparative Examples and various waterborne resins, and various evaluation tests shown below were carried out. The results of tests 1 to 4 are shown in Tables 1 to 3 below, the results of tests 5 and 6 are shown in Table 4 below, and the results of tests 7 to 9 are shown in Table 5 below. Tests 5 to 9 were carried out with the waterborne resin compositions shown in Tables 4 and 5 as typical examples for the Examples.

(Test 1) Storage Stability Test (1)

5 parts by mass of a waterborne resin crosslinking agent-containing liquid (waterborne resin crosslinking agent concentration of about 40% by mass) (about 2 parts by mass as waterborne resin crosslinking agent) was added to and mixed with 100 parts by mass of a waterborne acrylic resin ("AC261P," manufactured by the Dow Chemical Company, aqueous dispersion with about 40% by mass of resin solids) to prepare a waterborne resin composition.

Each waterborne resin composition was stored at 50° C., and a storage stability test (1) was carried out. The viscosity immediately after the preparation and that after a lapse of 30 days were measured, and the rate of change of the viscosity after the lapse of 30 days with respect to the viscosity immediately after the preparation was determined, thereby evaluating the storage stability. A viscosity change rate of 0% means that there is no viscosity change, and a viscosity change rate closer to 0% indicates better storage stability.

The viscosity was measured using a B-type viscometer ("TVB-10M," rotor: TM2, manufactured by Toki Sangyo Co., Ltd.) at a temperature of 20° C. and a rotation speed of 60 rpm.

In Comparative Example 1, the waterborne crosslinking agent and the waterborne resin were separated, and thus the viscosity was not measured. In Comparative Example 7, an aggregate was formed in the waterborne resin composition, and it was difficult to measure the viscosity.

(Test 2) Water Resistance Test (1)

Each waterborne resin composition prepared in (Test 1) was applied onto an aluminum plate using a wire rod No. 32 bar coater, dried at 120° C. for 10 minutes, and then left to stand at room temperature (25° C.) for 1 day to prepare a coating film sample.

A water resistance test (1) was carried out by placing absorbent cotton impregnated with ion-exchanged water on each coating film sample and leaving it to stand for 24 hours.

The state of the coating film sample after the test was visually observed and scored on a scale of 4 points based on the following evaluation criteria. The average score for 10 tests was used as the evaluation score and is shown in Tables 1 to 3 below. A higher evaluation score shows that the coating film has a better water resistance.

The coating film samples of Comparative Examples 1 and 7 had aggregates and were not homogeneous coating films.
<Evaluation Criteria>
  4 points: No change
  3.5 points: Contour mark in part
  3 points: Contour mark on the whole
  2.5 points: Partially less transparent
  2 points: Overall less transparent
  1.5 points: Partially opaque, partially slightly foamed
  1 point: Overall opaque, overall slightly foamed
  0.5 points: Overall foamed, crazing in the coating film
  0 points: Overall foamed or cracking in the coating film (Test 3) Solvent Resistance Test (1)

12.5 parts by mass of a waterborne resin crosslinking agent-containing liquid (waterborne resin crosslinking agent concentration of about 40% by mass) (about 5 parts by mass as waterborne resin crosslinking agent) was added to and mixed with 100 parts by mass of a waterborne polyurethane resin ("LOCTITE (registered trademark) TW600," manufactured by Henkel AG & Co. KGaA, aqueous dispersion with 35% by mass of resin solids, black paint) to prepare a waterborne resin composition.

Each waterborne resin composition was applied onto an aluminum plate using a wire rod No. 32 bar coater and dried at 100° C. for 5 minutes to prepare a coating film sample.

Each coating sample was subjected to a solvent resistance test (1) involving double rubbing the sample with absorbent cotton (load of 900 g/cm$^2$) impregnated with a 70% by mass ethanol aqueous solution as a solvent 50 times back and forth using a friction tester ("Model FR-1B," manufactured by Suga Test Instruments Co., Ltd.).

The state of the coating film sample after the test was visually observed, and the whitening properties, the remaining coating film area, and the grayscale (coloring condition of the absorbent cotton after double rubbing) were scored based on the following evaluation criteria. The average score of the three types of evaluation was calculated with a maximum of 5 points for each, and the average of this average score for two tests was used as the overall evaluation score and is shown in Tables 1 to 3 below. A higher overall evaluation score shows that the coating film has a better solvent resistance.

The coating film samples of Comparative Examples 1 and 7 had aggregates and were not homogeneous coating films.
<Evaluation Criteria>
[Whitening Properties]
  5 points: No change
  4 points: Light rubbing mark or slight whitening
  3 points: Partially whitened
  2 points: Overall whitened
  1 point: Partially melted
  0 points: Completely melted
[Remaining Coating Film Area]
  5 points: 100%
  4.5 points: 95% or more and less than 100%
  4 points: 85% or more and less than 95%
  3.5 points: 75% or more and less than 85%
  3 points: 60% or more and less than 75%
  2.5 points: 45% or more and less than 60%
  2 points: 40% or more and less than 45%
  1.5 points: 25% or more and less than 40%
  1 point: 10% or more and less than 25%
  0 points: less than 10%
[Gray Scale]

The evaluation criteria were based on the determination of Grey scale for assessing staining of JIS L 0805: 2005, and the grade number of a determination stage was used as the score. Grade 5 (5 points) is the case of not being colored at all, and grade 1 (1 point) is the case of being remarkably colored.

(Test 4) Water Resistant Adhesion Test 2 parts by mass of a waterborne resin crosslinking agent-containing liquid (waterborne resin crosslinking agent concentration of about 40% by mass) was added to and mixed with 100 parts by mass of a waterborne polyurethane resin ("HYDRAN AP-60LM," manufactured by DIC Corporation, aqueous dispersion with about 40% by mass of resin solids) to prepare a waterborne resin composition.

Each waterborne resin composition was applied onto a 100 μm-thick polyethylene terephthalate film whose surface was washed with acetone, using a wire rod No. 32 bar coater, and pre-dried at 60° C. for 1 minute. The application surfaces of the two application films were bonded to each other, sandwiched between polyethylene terephthalate films, and hot roll pressed (roll rotation speed of 0.5 rpm) at 80° C. The bonded film was cut into 2 cm×12 cm using a cutter to prepare a test piece.

Each test piece was immersed in ion-exchanged water for 24 hours, and the adhesive strength of the test piece before and after immersion was measured by a T-shaped peel test (peel speed of 100 mm/min) according to JIS K 6854-3: 1999. It can be deemed that the waterborne resin composition having a higher adhesive strength can exhibits better adhesion. In addition, it can be deemed that the water-resistant adhesion is better when the rate of decrease in adhesive strength before and after immersion is closer to 0.

The test pieces of Comparative Examples 1 and 7 were not sufficiently adhered even before immersion, and the adhesive strength could not be measured.

TABLE 1

| | | Polycarbodiimide compound (A) | | | Polycarbodiimide compound (B) | | | | | Total content of polyoxyalkylene group/ (A + B) [% by mass] |
|---|---|---|---|---|---|---|---|---|---|---|
| | No. | Oxyalkylene group [% by mass] | Molecular weight | Amount blended [parts by mass] | No. | Diisocyanate compound | End-capping compound | Molecular weight | Amount blended [parts by mass] | |
| Examples | 1 A1-1 | 37.5 | 2760 | 1 | B-1 | HMDI | CHI | 1078 | 99 | 0.4 |
| | 2 A1-1 | 37.5 | 2760 | 2 | B-1 | HMDI | CHI | 1078 | 98 | 0.8 |
| | 3 A1-1 | 37.5 | 2760 | 2 | B-1 | HMDI | CHI | 1078 | 98 | 0.8 |
| | 4 A1-1 | 37.5 | 2760 | 2 | B-1 | HMDI | CHI | 1078 | 98 | 0.8 |
| | 5 A1-1 | 37.5 | 2760 | 3 | B-1 | HMDI | CHI | 1078 | 97 | 1.1 |
| | 6 A1-2 | 46.4 | 2235 | 4.5 | B-1 | HMDI | CHI | 1078 | 95.5 | 2.1 |
| | 7 A1-2 | 46.4 | 2235 | 4.5 | B-2 | HMDI | CHI | 576 | 95.5 | 2.1 |
| | 8 A1-2 | 46.4 | 2235 | 10 | B-1 | HMDI | CHI | 1078 | 90 | 4.6 |
| | 9 A1-2 | 46.4 | 2235 | 20 | B-1 | HMDI | CHI | 1078 | 80 | 9.3 |
| | 10 A1-3 | 57.6 | 1799 | 2 | B-1 | HMDI | CHI | 1078 | 98 | 1.2 |
| | 11 A1-4 | 31.1 | 3327 | 2 | B-1 | HMDI | CHI | 1078 | 98 | 0.6 |
| | 12 A1-5 | 29.9 | 2460 | 1 | B-3 | HMDI | CHI | 2300 | 99 | 0.3 |
| | 13 A1-1 | 37.5 | 2760 | 20 | B-4 | HMDI | CHA | 3774 | 80 | 7.5 |
| | 14 A1-1 | 37.5 | 2760 | 2 | B-5 | HMDI | AA | 1922 | 98 | 0.8 |
| | 15 A1-1 | 37.5 | 2760 | 20 | B-5 | HMDI | AA | 1922 | 80 | 7.5 |
| | 16 A1-1 | 37.5 | 2760 | 2 | B-6 | HMDI | IPA | 1780 | 98 | 0.8 |
| | 17 A1-1 | 37.5 | 2760 | 20 | B-6 | HMDI | IPA | 1780 | 80 | 7.5 |
| | 18 A1-1 | 37.5 | 2760 | 2 | B-7 | HMDI | GM | 1840 | 98 | 0.8 |
| | 19 A1-1 | 37.5 | 2760 | 20 | B-7 | HMDI | GM | 1840 | 80 | 7.5 |
| | 20 A1-1 | 37.5 | 2760 | 2 | B-8 | HMDI | C18OH | 2197 | 98 | 0.8 |
| | 21 A1-1 | 37.5 | 2760 | 20 | B-8 | HMDI | C18OH | 2197 | 80 | 7.5 |
| | 22 A1-1 | 37.5 | 2760 | 20 | B-9 | HMDI | BzOH | 1876 | 80 | 7.5 |
| | 23 A1-1 | 37.5 | 2760 | 2 | B-10 | HDI | CHI | 702 | 98 | 0.8 |
| | 24 A1-1 | 37.5 | 2760 | 2 | B-11 | XDI | CHI | 782 | 98 | 0.8 |
| | 25 A1-1 | 37.5 | 2760 | 2 | B-12 | IPDI | CHI | 918 | 98 | 0.8 |

| | | Surfactant (C) | | Storage stability (1) | | | Water-resistant adhesion | | |
|---|---|---|---|---|---|---|---|---|---|
| | | No. | Amount blended [parts by mass] | Viscosity change rate [%] | Water resistance (1) [points] | Solvent resistance (1) [points] | Adhesive strength [N/mm²] Before immersion | After immersion | Rate of decrease [%] |
| Examples | 1 | C1 | 3 | 0 | 4 | 3 | 46.0 | 45.5 | 1.09 |
| | 2 | C1 | 3 | 0 | 4 | 3 | 44.3 | 45.0 | 0 |
| | 3 | C1/C8 | 3/3 | 0 | 4 | 3 | 44.3 | 43.8 | 1.13 |
| | 4 | C1/C8 | 3/4 | 0 | 4 | 3 | 44.3 | 43.0 | 2.93 |
| | 5 | C1/C8 | 3/2 | 0 | 4 | 3 | 44.3 | 43.9 | 0.90 |
| | 6 | C1 | 3 | 5 | 3.5 | 2.5 | 43.2 | 41.0 | 5.09 |
| | 7 | C1 | 3 | 5 | 3.6 | 2.5 | 44.0 | 42.0 | 4.55 |
| | 8 | C1 | 3 | 5 | 3.5 | 2.6 | 42.0 | 40.0 | 4.76 |
| | 9 | C1 | 3 | 5 | 3 | 2.1 | 50.0 | 45.0 | 10.0 |
| | 10 | C1 | 3 | 0 | 3.8 | 2.8 | 46.0 | 45.0 | 0 |
| | 11 | C1 | 3 | 0 | 4 | 3 | 46.0 | 45.0 | 0 |
| | 12 | C1 | 3 | 0 | 4 | 3 | 45.0 | 45.0 | 0 |
| | 13 | C1 | 3 | 20 | 3 | 2 | 49.0 | 45.0 | 8.16 |
| | 14 | C1 | 3 | 50 | 4 | 3 | 46.0 | 46.0 | 0 |
| | 15 | C1 | 3 | 50 | 3 | 2.3 | 50.0 | 45.0 | 10.0 |
| | 16 | C1 | 3 | 20 | 3.8 | 2.9 | 45.0 | 44.5 | 1.11 |
| | 17 | C1 | 3 | 20 | 3.1 | 2.3 | 49.0 | 45.0 | 8.16 |
| | 18 | C1 | 3 | 60 | 4 | 3 | 43.0 | 42.5 | 1.16 |
| | 19 | C1 | 3 | 60 | 3 | 2.3 | 50.0 | 46.0 | 8.00 |
| | 20 | C1 | 3 | 20 | 4 | 2.9 | 44.0 | 44.0 | 0 |
| | 21 | C1 | 3 | 20 | 3.5 | 2.6 | 50.0 | 46.0 | 8.00 |
| | 22 | C1 | 3 | 20 | 3 | 2.3 | 51.0 | 46.0 | 9.80 |
| | 23 | C1/C8 | 3/3 | 0 | 4 | 4 | 44.5 | 44.0 | 1.12 |
| | 24 | C1/C8 | 3/3 | 0 | 4 | 4 | 44.5 | 44.0 | 1.12 |
| | 25 | C1/C8 | 3/3 | 0 | 4 | 4 | 44.4 | 44.3 | 0.23 |

TABLE 2

| | | Polycarbodiimide compound (A) | | | Polycarbodiimide compound (B) | | | | | Total content of polyoxyalkylene group/ (A + B) [% by mass] |
|---|---|---|---|---|---|---|---|---|---|---|
| | No. | Oxyalkylene group [% by mass] | Molecular weight | Amount blended [parts by mass] | No. | Diisocyanate compound | End-capping compound | Molecular weight | Amount blended [parts by mass] | |
| Examples | 26 A1-1 | 37.5 | 2760 | 2 | B-1 | HMDI | CHI | 1078 | 98 | 0.8 |
| | 27 A1-1 | 37.5 | 2760 | 2 | B-1 | HMDI | CHI | 1078 | 98 | 0.8 |
| | 28 A1-1 | 37.5 | 2760 | 2 | B-1 | HMDI | CHI | 1078 | 98 | 0.8 |
| | 29 A1-1 | 37.5 | 2760 | 2 | B-1 | HMDI | CHI | 1078 | 98 | 0.8 |
| | 30 A1-1 | 37.5 | 2760 | 2 | B-1 | HMDI | CHI | 1078 | 98 | 0.8 |
| | 31 A1-1 | 37.5 | 2760 | 2 | B-1 | HMDI | CHI | 1078 | 98 | 0.8 |
| | 32 A1-1 | 37.5 | 2760 | 10 | B-1 | HMDI | CHI | 1078 | 90 | 3.8 |
| | 33 A1-1 | 37.5 | 2760 | 2 | B-1 | HMDI | CHI | 1078 | 98 | 0.8 |
| | 34 A1-1 | 37.5 | 2760 | 2 | B-1 | HMDI | CHI | 1078 | 98 | 0.8 |
| | 35 A1-1 | 37.5 | 2760 | 2 | B-1 | HMDI | CHI | 1078 | 98 | 0.8 |
| | 36 A1-1 | 37.5 | 2760 | 2 | B-1 | HMDI | CHI | 1078 | 98 | 0.8 |
| | 37 A1-1 | 37.5 | 2760 | 2 | B-1 | HMDI | CHI | 1078 | 98 | 0.8 |
| | 38 A1-1 | 37.5 | 2760 | 2 | B-1 | HMDI | CHI | 1078 | 98 | 0.8 |
| | 39 A1-1 | 37.5 | 2760 | 2 | B-1 | HMDI | CHI | 1078 | 98 | 0.8 |

| | | Surfactant (C) | | Storage stability (1) | | | Water-resistant adhesion | | |
|---|---|---|---|---|---|---|---|---|---|
| | | No. | Amount blended [parts by mass] | Viscosity change rate [%] | Water resistance (1) [points] | Solvent resistance (1) [points] | Adhesive strength [N/mm²] Before immersion | After immersion | Rate of decrease [%] |
| Examples | 26 | C1 | 3 | 0 | 4 | 3 | 45.0 | 44.5 | 1.11 |
| | 27 | C2 | 3 | 0 | 4 | 2.8 | 44.0 | 43.0 | 2.27 |
| | 28 | C3 | 3 | 0 | 4 | 3 | 43.0 | 43.0 | 0 |
| | 29 | C4 | 3 | 0 | 4 | 3 | 44.0 | 43.5 | 1.14 |
| | 30 | C5 | 3 | 0 | 4 | 3 | 44.0 | 43.5 | 1.14 |
| | 31 | C6 | 3 | 0 | 4 | 3 | 44.0 | 43.5 | 1.14 |
| | 32 | C7 | 3 | 0 | 3 | 2 | 41.0 | 40.0 | 2.44 |
| | 33 | C1 | 0.5 | 0 | 4 | 3 | 45.0 | 46.0 | −2.22 |
| | 34 | C1 | 5 | 0 | 4 | 2.9 | 45.0 | 44.3 | 1.56 |
| | 35 | C1 | 10 | 0 | 2.8 | 2.9 | 46.0 | 45.0 | 2.17 |
| | 36 | C2 | 0.5 | 0 | 4 | 3 | 45.0 | 45.0 | 0 |
| | 37 | C2 | 3 | 0 | 4 | 2.8 | 45.0 | 44.8 | 0.44 |
| | 38 | C2 | 5 | 0 | 4 | 2.8 | 46.0 | 45.3 | 1.52 |
| | 39 | C2 | 10 | 0 | 2.8 | 2.8 | 46.0 | 45.0 | 2.17 |

TABLE 3

| | | Polycarbodiimide compound (A) | | | | | Polycarbodiimide compound (B) | | | |
|---|---|---|---|---|---|---|---|---|---|---|
| | No. | End-capping compound (T1) | End-capping compound (T2) | Oxyalkylene group [% by mass] | Molecular weight | Amount blended [parts by mass] | No. | End-capping compound | Molecular weight | Amount blended [parts by mass] |
| Examples | 40 A2-1 | MP(550) | CHI | 22.6 | 2291 | 2 | B-1 | CHI | 1078 | 98 |
| | 41 A2-1 | MP(550) | CHI | 22.6 | 2291 | 20 | B-1 | CHI | 1078 | 80 |
| | 42 A2-2 | MP(550) | AA | 22.1 | 2341 | 2 | B-1 | CHI | 1078 | 98 |
| | 43 A2-2 | MP(550) | AA | 22.1 | 2341 | 20 | B-1 | CHI | 1078 | 80 |
| | 44 A2-3 | MP(550) | BzOH | 22.3 | 2318 | 2 | B-1 | CHI | 1078 | 98 |
| | 45 A2-3 | MP(550) | BzOH | 22.3 | 2318 | 20 | B-1 | CHI | 1078 | 80 |
| Comparative Examples | 1 A1-1 | MP(550) | — | 37.5 | 2760 | 1 | B-1 | CHI | 1078 | 99 |
| | 2 A1-1 | MP(550) | — | 37.5 | 2760 | 20 | B-1 | CHI | 1078 | 80 |
| | 3 A1-1 | MP(550) | — | 37.5 | 2760 | 80 | B-1 | CHI | 1078 | 20 |
| | 4 A1-1 | MP(550) | — | 37.5 | 2760 | 30 | B-1 | CHI | 1078 | 70 |
| | 5 A1-1 | MP(550) | — | 37.5 | 2760 | 40 | B-1 | CHI | 1078 | 60 |
| | 6 A1-6 | MP(500) | — | 35.2 | 2660 | 40 | B-7 | GM | 1840 | 60 |
| | 7 — | — | — | — | — | — | B-1 | CHI | 1078 | 100 |

TABLE 3-continued

|  |  | Total content of polyoxyalkylene group/ (A + B) [% by mass] | Surfactant (C) No. | Amount blended [parts by mass] | Storage stability (1) Viscosity change rate [%] | Water resistance (1) [points] | Solvent resistance (1) [points] | Water-resistant adhesion Adhesive strength [N/mm$^2$] Before immersion | After immersion | Rate of decrease [%] |
|---|---|---|---|---|---|---|---|---|---|---|
| Examples | 40 | 0.5 | C1 | 3 | 0 | 4 | 3 | 43.0 | 43.0 | 0 |
|  | 41 | 4.5 | C1 | 3 | 0 | 3.5 | 2.5 | 45.0 | 43.0 | 4.44 |
|  | 42 | 0.4 | C1 | 3 | 0 | 4 | 3 | 42.0 | 42.0 | 0 |
|  | 43 | 4.4 | C1 | 3 | 0 | 3.5 | 2.6 | 46.0 | 44.0 | 4.35 |
|  | 44 | 0.4 | C1 | 3 | 0 | 4 | 3 | 43.0 | 42.0 | 2.33 |
|  | 45 | 4.5 | C1 | 3 | 0 | 3.5 | 2.6 | 47.0 | 45.0 | 4.26 |
| Comparative Examples | 1 | 0.4 | — | — | — | 1* | 0.2* | — | — | — |
|  | 2 | 7.5 | C1 | 30 | 100 | 1 | 1 | 42.0 | 30.0 | 28.6 |
|  | 3 | 30.0 | C1 | 3 | 350 | 1 | 1.5 | 43.0 | 11.0 | 74.4 |
|  | 4 | 11.3 | — | — | 300 | 1 | 1.5 | 40.0 | 25.0 | 37.5 |
|  | 5 | 15.0 | C1 | 3 | 330 | 1 | 1 | 40.0 | 20.0 | 50.0 |
|  | 6 | 14.1 | C1 | 3 | 330 | 1 | 0.9 | 42.0 | 18.0 | 57.1 |
|  | 7 | 0 | C1 | 50 | — | 1* | 0.2* | — | — | — |

*Aggregate in the coating film (Test 5) Storage Stability Test (2)

15 parts by mass of a waterborne resin crosslinking agent-containing liquid (waterborne resin crosslinking agent concentration of about 40% by mass) (about 7 parts by mass as waterborne resin crosslinking agent), 25 parts by mass of a dye ("Dyestone (registered trademark) X Color Blue MX," manufactured by Matsui Shikiso Chemical Co., Ltd.), and 865 parts by mass of ion-exchanged water were added to and mixed with 100 parts by mass of a waterborne acrylic resin ("BINDER EDC-250," manufactured by Dainichiseika Color & Chemicals Mfg. Co., Ltd., aqueous dispersion with 14% by mass of resin solids) to prepare a waterborne resin composition for fiber treatment.

Each waterborne resin composition was stored at 50° C., and a storage stability test (2) was carried out. The viscosity immediately after the preparation and that after a lapse of 30 days were measured, and the rate of change of the viscosity after the lapse of 30 days with respect to the viscosity immediately after the preparation was determined, thereby evaluating the storage stability. A viscosity change rate of 0% means that there is no viscosity change, and a viscosity change rate closer to 0% indicates better storage stability.

The viscosity was measured using a B-type viscometer ("TVB-10M," rotor: TM2, manufactured by Toki Sangyo Co., Ltd.) at a temperature of 20° C. and a rotation speed of 60 rpm.

In Comparative Example 1, the waterborne crosslinking agent and the waterborne resin were separated, and thus the viscosity was not measured. In Comparative Example 7, an aggregate was formed in the waterborne resin composition, and it was difficult to measure the viscosity.

(Test 6) Water Resistance Test (2)

A gray fabric (cotton) was dipped in the waterborne resin composition for fiber treatment prepared in (test 5), and the gray fabric impregnated with the waterborne resin composition was dried in a dryer at 100° C. for 2 minutes and then left to stand at 25° C. for 1 day to obtain a fabric sample.

Each fabric sample was subjected to a color fastness test involving moving water-impregnated absorbent cotton (standard adjacent fabric) (load of 900 g/cm$^2$) 100 times back and forth using a friction tester ("Model FR-1B," manufactured by Suga Test Instruments Co., Ltd.), and this test was used as a water resistance test (2).

The state of the fabric sample and the standard adjacent fabric after the test was visually observed to grade the discoloration (change in color) of the fabric sample and the color transfer (staining) to the standard adjacent fabric based on the grayscales of JIS L 0804: 2004 and JIS L 0805: 2005, respectively, and the grade was used as the score.

For discoloration, grade 5 (5 points) is the case of not being discolored at all, and grade 1 (1 point) is the case of being remarkably discolored. For color transfer, grade 5 (5 points) is the case of not being colored at all, and grade 1 (1 point) is the case of being remarkably colored.

The average score of the respective evaluation scores of discoloration and color transfer was calculated, and the average of this average score for two tests was used as the overall evaluation score and is shown in Table 4 below. A higher overall evaluation score shows that the fabric sample has a better water resistance.

An aggregate was observed on the surface of the fabric samples of Comparative Examples 1 and 7.

TABLE 4

|  |  | Polycarbodiimide compound (A) | | | | Polycarbodiimide compound (B) | | | |
|---|---|---|---|---|---|---|---|---|---|
|  |  | No. | Oxyalkylene group [% by mass] | Molecular weight | Amount blended [parts by mass] | No. | Diisocyanate compound | End-capping compound | Molecular weight |
| Examples | 1 | A1-1 | 37.5 | 2760 | 1 | B-1 | HMDI | CHI | 1078 |
|  | 2 | A1-1 | 37.5 | 2760 | 2 | B-1 | HMDI | CHI | 1078 |
|  | 3 | A1-1 | 37.5 | 2760 | 2 | B-1 | HMDI | CHI | 1078 |

TABLE 4-continued

| | | | | | | | | | |
|---|---|---|---|---|---|---|---|---|---|
| | 14 | A1-1 | 37.5 | 2760 | 2 | B-5 | HMDI | AA | 1922 |
| | 16 | A1-1 | 37.5 | 2760 | 2 | B-6 | HMDI | IPA | 1780 |
| | 18 | A1-1 | 37.5 | 2760 | 2 | B-7 | HMDI | GM | 1840 |
| | 20 | A1-1 | 37.5 | 2760 | 2 | B-8 | HMDI | C18OH | 2197 |
| | 22 | A1-1 | 37.5 | 2760 | 20 | B-9 | HMDI | BzOH | 1876 |
| | 23 | A1-1 | 37.5 | 2760 | 2 | B-10 | HDI | CHI | 702 |
| | 24 | A1-1 | 37.5 | 2760 | 2 | B-11 | XDI | CHI | 782 |
| | 25 | A1-1 | 37.5 | 2760 | 2 | B-12 | IPDI | CHI | 918 |
| Comparative Examples | 1 | A1-1 | 37.5 | 2760 | 1 | B-1 | HMDI | CHI | 1078 |
| | 2 | A1-1 | 37.5 | 2760 | 20 | B-1 | HMDI | CHI | 1078 |
| | 3 | A1-1 | 37.5 | 2760 | 80 | B-1 | HMDI | CHI | 1078 |
| | 4 | A1-1 | 37.5 | 2760 | 30 | B-1 | HMDI | CHI | 1078 |
| | 5 | A1-1 | 37.5 | 2760 | 40 | B-1 | HMDI | CHI | 1078 |
| | 6 | A1-6 | 35.2 | 2660 | 40 | B-7 | HMDI | GM | 1840 |
| | 7 | — | — | — | — | B-1 | HMDI | CHI | 1078 |

| | | Polycarbodiimide compound (B) | Total content of polyoxyalkylene group/ (A + B) [% by mass] | Surfactant (C) | | Storage stability (2) | |
|---|---|---|---|---|---|---|---|
| | | Amount blended [parts by mass] | | No. | Amount blended [parts by mass] | Viscosity change rate [%] | Water resistance (2) [points] |
| Examples | 1 | 99 | 0.4 | C1 | 3 | 0 | 5 |
| | 2 | 98 | 0.8 | C1 | 3 | 1 | 5 |
| | 3 | 98 | 0.8 | C1/C8 | 3/3 | 0 | 5 |
| | 14 | 98 | 0.8 | C1 | 3 | 40 | 4 |
| | 16 | 98 | 0.8 | C1 | 3 | 25 | 4 |
| | 18 | 98 | 0.8 | C1 | 3 | 55 | 4 |
| | 20 | 98 | 0.8 | C1 | 3 | 30 | 4 |
| | 22 | 80 | 7.5 | C1 | 3 | 30 | 4 |
| | 23 | 98 | 0.8 | C1/C8 | 3/3 | 0 | 5 |
| | 24 | 98 | 0.8 | C1/C8 | 3/3 | 0 | 5 |
| | 25 | 98 | 0.8 | C1/C8 | 3/3 | 0 | 5 |
| Comparative Examples | 1 | 99 | 0.4 | — | — | — | 1* |
| | 2 | 80 | 7.5 | C1 | 30 | 120 | 1 |
| | 3 | 20 | 30.0 | C1 | 3 | 360 | 1 |
| | 4 | 70 | 11.3 | — | — | 320 | 1 |
| | 5 | 60 | 15.0 | C1 | 3 | 350 | 1 |
| | 6 | 60 | 14.1 | C1 | 3 | 350 | 1 |
| | 7 | 100 | 0 | C1 | 50 | — | 1* |

*Aggregate on the fabric sample surface (Test 7) Storage Stability Test (3)

5 parts by mass of a waterborne resin crosslinking agent-containing liquid (waterborne resin crosslinking agent concentration of about 40% by mass) (about 2 parts by mass as waterborne resin crosslinking agent) was added to and mixed with 100 parts by mass of a waterborne polyester resin ("PLAS COAT (registered trademark) Z-730," manufactured by GOO Chemical Co., Ltd., aqueous dispersion with 25% by mass of resin solids) to prepare a waterborne resin composition.

Each waterborne resin composition was subjected to a storage stability test (3) in the same manner as in (test 1).

In Comparative Example 1, the waterborne crosslinking agent and the waterborne resin were separated, and thus the viscosity was not measured. In Comparative Example 7, an aggregate was formed in the waterborne resin composition, and it was difficult to measure the viscosity.

(Test 8) Water Resistance Test (3)

On each waterborne resin composition prepared in (test 7), a water resistance test (3) was carried out in the same manner as in (test 2). The evaluation was also carried out in the same manner as in (test 2).

The coating film samples of Comparative Examples 1 and 7 had aggregates and were not homogeneous coating films.

(Test 9) Solvent Resistance Test (2)

On each waterborne resin composition prepared in (test 7), a solvent resistance test (2) was carried out in the same manner as in (test 3). The evaluation was also carried out in the same manner as in (test 3).

The coating film samples of Comparative Examples 1 and 7 had aggregates and were not homogeneous coating films.

TABLE 5

| | | Polycarbodiimide compound (A) | | | | Polycarbodiimide compound (B) | | | |
|---|---|---|---|---|---|---|---|---|---|
| | | No. | Oxyalkylene group [% by mass] | Molecular weight | Amount blended [parts by mass] | No. | Diisocyanate compound | End-capping compound | Molecular weight | Amount blended [parts by mass] |
| Examples | 1 | A1-1 | 37.5 | 2760 | 1 | B-1 | HMDI | CHI | 1078 | 99 |
| | 2 | A1-1 | 37.5 | 2760 | 2 | B-1 | HMDI | CHI | 1078 | 98 |

TABLE 5-continued

|  |  | No. | A | (A) [% by mass] | Molecular weight | Blend ratio (A/B) | No. | Isocyanate | End-capping compound (T) | Molecular weight | Cap ratio [%] |
|---|---|---|---|---|---|---|---|---|---|---|---|
|  | 3 | A1-1 | 37.5 | 2760 | 2 | B-1 | HMDI | CHI | 1078 | 98 |
|  | 4 | A1-1 | 37.5 | 2760 | 2 | B-1 | HMDI | CHI | 1078 | 98 |
|  | 5 | A1-1 | 37.5 | 2760 | 3 | B-1 | HMDI | CHI | 1078 | 97 |
|  | 13 | A1-1 | 37.5 | 2760 | 20 | B-4 | HMDI | CHA | 3774 | 80 |
|  | 14 | A1-1 | 37.5 | 2760 | 2 | B-5 | HMDI | AA | 1922 | 98 |
|  | 15 | A1-1 | 37.5 | 2760 | 20 | B-5 | HMDI | AA | 1922 | 80 |
|  | 16 | A1-1 | 37.5 | 2760 | 2 | B-6 | HMDI | IPA | 1780 | 98 |
|  | 17 | A1-1 | 37.5 | 2760 | 20 | B-6 | HMDI | IPA | 1780 | 80 |
|  | 18 | A1-1 | 37.5 | 2760 | 2 | B-7 | HMDI | GM | 1840 | 98 |
|  | 19 | A1-1 | 37.5 | 2760 | 20 | B-7 | HMDI | GM | 1840 | 80 |
|  | 20 | A1-1 | 37.5 | 2760 | 2 | B-8 | HMDI | C18OH | 2197 | 98 |
|  | 21 | A1-1 | 37.5 | 2760 | 20 | B-8 | HMDI | C18OH | 2197 | 80 |
|  | 22 | A1-1 | 37.5 | 2760 | 20 | B-9 | HMDI | BzOH | 1876 | 80 |
|  | 23 | A1-1 | 37.5 | 2760 | 2 | B-10 | HDI | CHI | 702 | 98 |
|  | 24 | A1-1 | 37.5 | 2760 | 2 | B-11 | XDI | CHI | 782 | 98 |
|  | 25 | A1-1 | 37.5 | 2760 | 2 | B-12 | IPDI | CHI | 918 | 98 |
| Comparative Examples | 1 | A1-1 | 37.5 | 2760 | 1 | B-1 | HMDI | CHI | 1078 | 99 |
|  | 2 | A1-1 | 37.5 | 2760 | 20 | B-1 | HMDI | CHI | 1078 | 80 |
|  | 3 | A1-1 | 37.5 | 2760 | 80 | B-1 | HMDI | CHI | 1078 | 20 |
|  | 4 | A1-1 | 37.5 | 2760 | 30 | B-1 | HMDI | CHI | 1078 | 70 |
|  | 5 | A1-1 | 37.5 | 2760 | 40 | B-1 | HMDI | CHI | 1078 | 60 |
|  | 6 | A1-6 | 35.2 | 2660 | 40 | B-7 | HMDI | GM | 1840 | 60 |
|  | 7 | — | — | — | — | B-1 | HMDI | CHI | 1078 | 100 |

|  |  | Total content of polyoxyalkylene group/(A + B) [% by mass] | Surfactant (C) | | Storage stability (3) Viscosity change rate [%] | Water resistance (3) [points] | Solvent resistance (2) [points] |
|---|---|---|---|---|---|---|---|
|  |  |  | No. | Amount blended [parts by mass] |  |  |  |
| Examples | 1 | 0.4 | C1 | 3 | 0 | 4 | 3.3 |
|  | 2 | 0.8 | C1 | 3 | 0 | 4 | 3.3 |
|  | 3 | 0.8 | C1/C8 | 3/3 | 0 | 4 | 3.3 |
|  | 4 | 0.8 | C1/C8 | 3/4 | 0 | 4 | 3.3 |
|  | 5 | 1.1 | C1/C8 | 3/2 | 0 | 4 | 3.3 |
|  | 13 | 7.5 | C1 | 3 | 25 | 3.2 | 2.1 |
|  | 14 | 0.8 | C1 | 3 | 50 | 4 | 3.2 |
|  | 15 | 7.5 | C1 | 3 | 50 | 3 | 2.3 |
|  | 16 | 0.8 | C1 | 3 | 25 | 3.7 | 2.9 |
|  | 17 | 7.5 | C1 | 3 | 25 | 3 | 2.3 |
|  | 18 | 0.8 | C1 | 3 | 60 | 4 | 3 |
|  | 19 | 7.5 | C1 | 3 | 60 | 3 | 2.5 |
|  | 20 | 0.8 | C1 | 3 | 25 | 4 | 2.9 |
|  | 21 | 7.5 | C1 | 3 | 25 | 3.5 | 2.6 |
|  | 22 | 7.5 | C1 | 3 | 25 | 3 | 2.3 |
|  | 23 | 0.8 | C1/C8 | 3/3 | 0 | 4 | 4 |
|  | 24 | 0.8 | C1/C8 | 3/3 | 0 | 4 | 4 |
|  | 25 | 0.8 | C1/C8 | 3/3 | 0 | 4 | 4 |
| Comparative Examples | 1 | 0.4 | — | — | — | 1* | 0.2* |
|  | 2 | 7.5 | C1 | 30 | 200 | 1 | 1 |
|  | 3 | 30.0 | C1 | 3 | 500 | 1 | 1.5 |
|  | 4 | 11.3 | — | — | 450 | 1 | 1.5 |
|  | 5 | 15.0 | C1 | 3 | 400 | 1 | 1 |
|  | 6 | 14.1 | C1 | 3 | 400 | 1 | 0.9 |
|  | 7 | 0 | C1 | 50 | — | 1* | 0.2* |

*Aggregate in the coating film

As can be seen from the results shown in Tables 1 to 5, it was found that the waterborne resin crosslinking agent of the present invention has excellent storage stability in a state of coexisting with a waterborne resin, and that use of this waterborne resin crosslinking agent can provide a cured product of the waterborne resin having excellent water resistance, solvent resistance, and water-resistant adhesion.

The invention claimed is:

1. A waterborne resin crosslinking agent comprising at least one polycarbodiimide compound (A) selected from the group consisting of a polycarbodiimide compound (A1) and a polycarbodiimide compound (A2), a polycarbodiimide compound (B), and a surfactant (C), wherein the polycarbodiimide compound (A1) has a structure in which an isocyanate group is capped with an end-capping compound (T1) represented by the following general formula (1) at each one of a first and a second terminal of the polycarbodiimide compound (A1), the polycarbodiimide compound (A2) has a structure in which an isocyanate group is capped with the end-capping compound (T1) at a first terminal of the polycarbodiimide compound (A2), and has a structure in which an isocyanate group is capped with an end-capping compound (T2) at a second terminal of the polycarbodiimide compound (A2), the polycarbodiimide compound (B) has a structure in which an isocyanate group is capped with an end-capping compound (T3) at a first terminal of the polycarbodiimide compound (B), and has a structure in which an isocyanate group is end-capped with an end-capping compound (T4) at a second terminal of the polycarbodiimide compound (B):

$$R^1(OCHR^2CH_2)_nOH \quad (1)$$

wherein $R^1$ is an alkyl group having 1 to 4 carbon atoms; $R^2$ is a hydrogen atom or a methyl group; n is an integer of 7 to 30; and the end-capping compound (T1) capping the first terminal of the polycarbodiimide compound (A1) and the end-capping compound (T1) capping the second terminal thereof, and the end-capping compound (T1) capping the first terminal of the polycarbodiimide compound (A2) may be the same or different from each other, the end-capping compounds (T2), (T3), and (T4) are each independently a compound having one amino group, isocyanate group, epoxy group, or carboxy group, or a compound having one hydroxyl group other than the end-capping compound (T1), a total content of an oxyalkylene group ($OCHR^2CH_2$) in the polycarbodiimide compound (A) is 15% by mass or more, a total content of an oxyalkylene group in the polycarbodiimide compounds (A) and (B) based on a total amount of the polycarbodiimide compounds (A) and (B) is 0.3 to 1.2% by mass, a content of the surfactant (C) is 0.1 to 20 parts by mass based on a total content of the polycarbodiimide compounds (A) and (B) of 100 parts by mass, and a content of the polycarbodiimide (A) is 1 to 3 parts by mass based on a total content of the polycarbodiimide compounds (A) and (B) of 100 parts by mass.

2. The waterborne resin crosslinking agent according to claim 1, wherein the polycarbodiimide compound (A) is the polycarbodiimide compound (A1).

3. The waterborne resin crosslinking agent according to claim 1, wherein the polycarbodiimide compound (A) is a mixture of the polycarbodiimide compound (A1) and the polycarbodiimide compound (A2).

4. The waterborne resin crosslinking agent according to claim 1, wherein the end-capping compound (T1) capping one terminal of the polycarbodiimide compound (A1) and the end-capping compound (T1) capping the other terminal thereof are the same.

5. The waterborne resin crosslinking agent according to claim 1, wherein the end-capping compounds (T3) and (T4) are the same.

6. The waterborne resin crosslinking agent according to claim 1, wherein the end-capping compound (T1) is polyethylene glycol monomethyl ether.

7. The waterborne resin crosslinking agent according to claim 1, wherein the surfactant (C) is one or more selected from the group consisting of an anionic surfactant and a nonionic surfactant.

8. A waterborne resin crosslinking agent-containing liquid comprising the waterborne resin crosslinking agent according to claim 1 and an aqueous medium.

9. The waterborne resin crosslinking agent-containing liquid according to claim 8, wherein the aqueous medium is water or a mixed solvent of water and a hydrophilic solvent.

10. A waterborne resin composition comprising the waterborne resin crosslinking agent and a waterborne resin, the waterborne resin crosslinking agent comprising at least one polycarbodiimide compound (A) selected from the group consisting of a polycarbodiimide compound (A1) and a polycarbodiimide compound (A2), a polycarbodiimide compound (B), and a surfactant (C), wherein the polycarbodiimide compound (A1) has a structure in which an isocyanate group is capped with an end-capping compound (T1) represented by the following general formula (1) at each one of a first and a second terminal of the polycarbodiimide compound (A1), the polycarbodiimide compound (A2) has a structure in which an isocyanate group is capped with the end-capping compound (T1) at a first terminal of the polycarbodiimide compound (A2), and has a structure in which an isocyanate group is capped with an end-capping compound (T2) at a second terminal of the polycarbodiimide compound (A2), the polycarbodiimide compound (B) has a structure in which an isocyanate group is capped with an end-capping compound (T3) at a first terminal of the polycarbodiimide compound (B), and has a structure in which an isocyanate group is end-capped with an end-capping compound (T4) at a second terminal of the polycarbodiimide compound (B):

$$R^1(OCHR^2CH_2)_nOH \quad (1)$$

wherein $R^1$ is an alkyl group having 1 to 4 carbon atoms; $R^2$ is a hydrogen atom or a methyl group; n is an integer of 7 to 30; and the end-capping compound (T1) capping the first terminal of the polycarbodiimide compound (A1) and the end-capping compound (T1) capping the second terminal thereof, and the end-capping compound (T1) capping the first terminal of the polycarbodiimide compound (A2) may be the same or different from each other, the end-capping compounds (T2), (T3), and (T4) are each independently a compound having one amino group, isocyanate group, epoxy group, or carboxy group, or a compound having one hydroxyl group other than the end-capping compound (T1), a total content of an oxyalkylene group ($OCHR^2CH_2$) in the polycarbodiimide compound (A) is 15% by mass or more, a total content of an oxyalkylene group in the polycarbodiimide compounds (A) and (B) based on a total amount of the polycarbodiimide compounds (A) and (B) is 0.3 to 1.2% by mass, a content of the surfactant (C) is 0.1 to 20 parts by mass based on a total content of the polycarbodiimide compounds (A) and (B) of 100 parts by mass, and a content of the polycarbodiimide (A) is 1 to 3 parts by mass based on a total content of the polycarbodiimide compounds (A) and (B) of 100 parts by mass.

11. The waterborne resin composition according to claim 10, wherein the waterborne resin has a group selected from the group consisting of a carboxy group, an amino group, and a hydroxyl group.

12. The waterborne resin composition according to claim 10, wherein the waterborne resin is one or more selected from the group consisting of a polyester resin, an acrylic resin, a polyurethane resin, an epoxy resin, a styrene-acrylic resin, a melamine resin, a polyolefin resin, and a fluororesin.

13. The waterborne resin composition according to claim 10, wherein the waterborne resin composition is an adhesive composition, a fiber treatment agent composition, a coating agent composition, or a paint composition.

14. The waterborne resin composition according to claim 13, wherein the paint composition is wet-on-wet coating composition.

15. A resin film formed from the waterborne resin composition according to claim 10.

16. An article obtained by forming the resin film according to claim 15 on a base material.

* * * * *